United States Patent [19]

Presti

[11] 4,011,401
[45] Mar. 8, 1977

[54] SPECIAL EFFECTS GENERATOR CAPABLE OF REPOSITIONING IMAGE SEGMENTS

[75] Inventor: Biagio Presti, Bloomington, Ind.

[73] Assignee: Sarkes Tarzian, Inc., Bloomington, Ind.

[22] Filed: Apr. 25, 1975

[21] Appl. No.: 571,521

[52] U.S. Cl. .......................... 358/212; 178/DIG. 6; 358/160; 358/183
[51] Int. Cl.[2] ....................................... H04N 5/22
[58] Field of Search ................ 178/6.8, 7.7, DIG. 6

[56] References Cited

UNITED STATES PATENTS

| | | | |
|---|---|---|---|
| 3,622,697 | 11/1971 | Metzger | 178/7.7 |
| 3,641,260 | 2/1972 | Herndon | 178/7.7 |
| 3,697,678 | 10/1972 | Belleson | 178/DIG. 6 |
| 3,758,712 | 9/1973 | Hudson | 178/6.8 |
| 3,803,445 | 4/1974 | Wagner | 178/7.7 |

Primary Examiner—Howard W. Britton
Attorney, Agent, or Firm—Mason, Kolehmainen, Rathburn & Wyss

[57] ABSTRACT

An area-imaging device is scanned by digital logic in an arbitrary manner which dissects and reassembles the scanned image in an arbitrary way, shifting and rearranging the image segments which comprise the image in accordance with a pre-arranged scheme. The area-imaging device preferably includes a two-dimensional array of light-sensing elements upon which an image is projected using conventional optics. Each light-sensing element in the array is individually addressable using a digital x-y-coordinate addressing scheme. Digital logic circuitry generates an arbitrarily complex scanning pattern comprising pairs of x- and y-coordinate values, and these coordinate values are supplied sequentially to the area-imaging device. The video information retrieved from the individual device elements in response to this scanning pattern is assembled time-wise into a video signal suitable for display upon the face of a conventional television display device that is scanned in a conventional way. By choosing the proper digital logic circuit elements, it is possible to achieve image-segment-rotation effects, image segment size-change effects, and effects in which image segments are moved horizontally and/or vertically. Pseudo-random scanning patterns may also be realized to encode an image prior to its transmission or storage.

17 Claims, 13 Drawing Figures

SPECIAL EFFECTS GENERATOR CAPABLE OF REPOSITIONING IMAGE SEGMENTS

BACKGROUND OF THE INVENTION

Conventional television special-effects generators are capable of achieving a wide variety of linear, circular, elliptical and rotational wipes and multiple-image-segment effects. A sophisticated conventional special effects generator, for example, can easily extract a circular central portion from one incoming signal-borne image and substitute or switch it for a second incoming signal-borne image in such a manner that the diameter of the circular central portion may be freely varied. See, for example, the special-effects generator which is disclosed in U.S. Pat. No. 3,758,712 which issued on Sept. 11, 1973 to John P. Hudson.

A shortcoming of such conventional generators is their inability to reposition an image segment within an image. For example, if a video signal is conveying an image that contains a man's face in the upper left-hand corner of the conveyed image, there is no way that a conventional special-effects generator can rotate, alter the size of, or reposition the man's face within the conveyed image. For example, the man's face cannot be shifted to the center of the conveyed image by a conventional special-effects generator. This shortcoming remains regardless of how sophisticated the conventional special-effects generator may be in other respects.

Optical and mechanical techniques may be used to reposition, rotate, and alter the size of image segments before the segments are impressed upon a video signal. For example, image rotation may be achieved by utilizing a Pechan prism and image size adjustment can be achieved by utilizing a zoom lens. These mechanical techniques are not easily controlled digitally, however, and they lack flexibility. Many effects easily achievable using the present invention could only be achieved with great difficulty, if at all, using a mechanical optical system of great complexity.

Computers have been used successfully to digitize video information and subsequently to manipulate the digitized data for modifying the video image; however, those systems are very expensive and limited in their applications due to cost and the size of the computer required.

SUMMARY OF THE INVENTION

Accordingly, a primary object of the present invention is the realizaton of a video special effects generator which is able to reposition and rotate image segments within an image plane in an arbitrary manner. It is desired to achieve not only linear displacement of an image, but also image size alterations and image rotations without the need for complicated optical accessories.

A further object of the present invention is the achievement of the above in combination with the achievement of other more conventional special effects such as wipe effects, rotation effects, and other such effects, under digital control.

Briefly described, the preferred embodiment of the present invention contemplates utilizing two-dimensional area imaging devices constructed from plural image sensing elements which may be scanned in an arbitrary manner to generate a video signal. As an example, the area imaging device might comprise a two-dimensional array of phototransistors having base regions which are sensitive to incident light. Such a device may be used in television cameras as a substitute for the more conventional vidicons and other image sensing devices presently used. Addressing means are incorporated into this array whereby each individual light-sensing element of the array can be addressed by means of a digital address code. For example, the code may comprise the $x$ and $y$ coordinates of a single phototransistor expressed in digital terms. A digital logic circuit is provided which can generate any arbitrary time-sequence of $x$ and $y$ coordinate digital values and which can thereby cause the scanning of the two-dimensional array to proceed in an arbitrary manner, rather than from left to right and from top to bottom as in a conventional vidicon.

In the preferred embodiment of the invention, the digital logic circuit includes counters which generate a sequence of $x$ and $y$ coordinate values. These values correspond in function to the horizontal and vertical sawtooth waveforms which are used in scanning a conventional vidicon. Horizontal and vertical displacement of an image segment may be achieved either by starting these counters at a non-zero count value or by adding or subtracting a fixed or variable value to the counter-generated coordinate values, or by some equivalent procedure. Image rotation is achieved by multiplying the horizontal and vertical count values by appropriate constants and then summing the resulting products to achieve the equivalent of a rotated scanning pattern. Image size adjustments may be accomplished by varying the speed of the counters, by scaling the count values, or by using differing interconnections between the counter signal output terminals and the addressing means. Multiple images can be achieved by simply scanning the array at a higher speed than normal, for example, at twice the normal horizontal and vertical scanning rate to achieve four duplicate reduced-size images.

It is contemplated that several cameras may be used simultaneously in conjunction with the present invention, and portions of the signals generated by each of the cameras can then be combined, using time-switching circuitry, into arbitrary special effects in ways which were heretofore impossible. For example, the present invention makes it possible to take image segments from the central regions of four separate cameras and combine them into a composite image in such a manner that each image occupies one corner of the resultant composite image, rather than the center of the composite image. The resulting composite image can then be rotated so that the four image segments rotate about one another while remaining upright and without any motion of the four cameras. The effect just described is achieved by careful selection, under digital control, of which sensing elements of the area imaging device within each television camera are sampled at each moment in time.

Other embodiments of the present invention are contemplated. For example, an area imaging device can be arranged to receive light from an image display device. The image display device could then be controlled by any video signal source, for example, the signal output of a video tape recorder or other video information storage device. The invention would function as described but would be used to edit pre-recorded video scenes. In such an embodiment of the invention, the speed of the video tape recorder can be substantially reduced to permit the use of a higher-resolution area imaging device than might otherwise be possible, due to practical limitations on the speed at which a high-resolution device can be scanned in an arbitrary manner.

Additional objects and advantages of the present invention are apparent in the detailed description which follows. The features of novelty which characterize the invention are pointed out with particularity in the claims annexed to and forming a part of this specification.

BRIEF DESCRIPTION OF THE DRAWINGS

For a better understanding of the present invention, reference will be made to the drawings wherein.

DETAILED DESCRIPTION OF THE INVENTION

Figure 1:
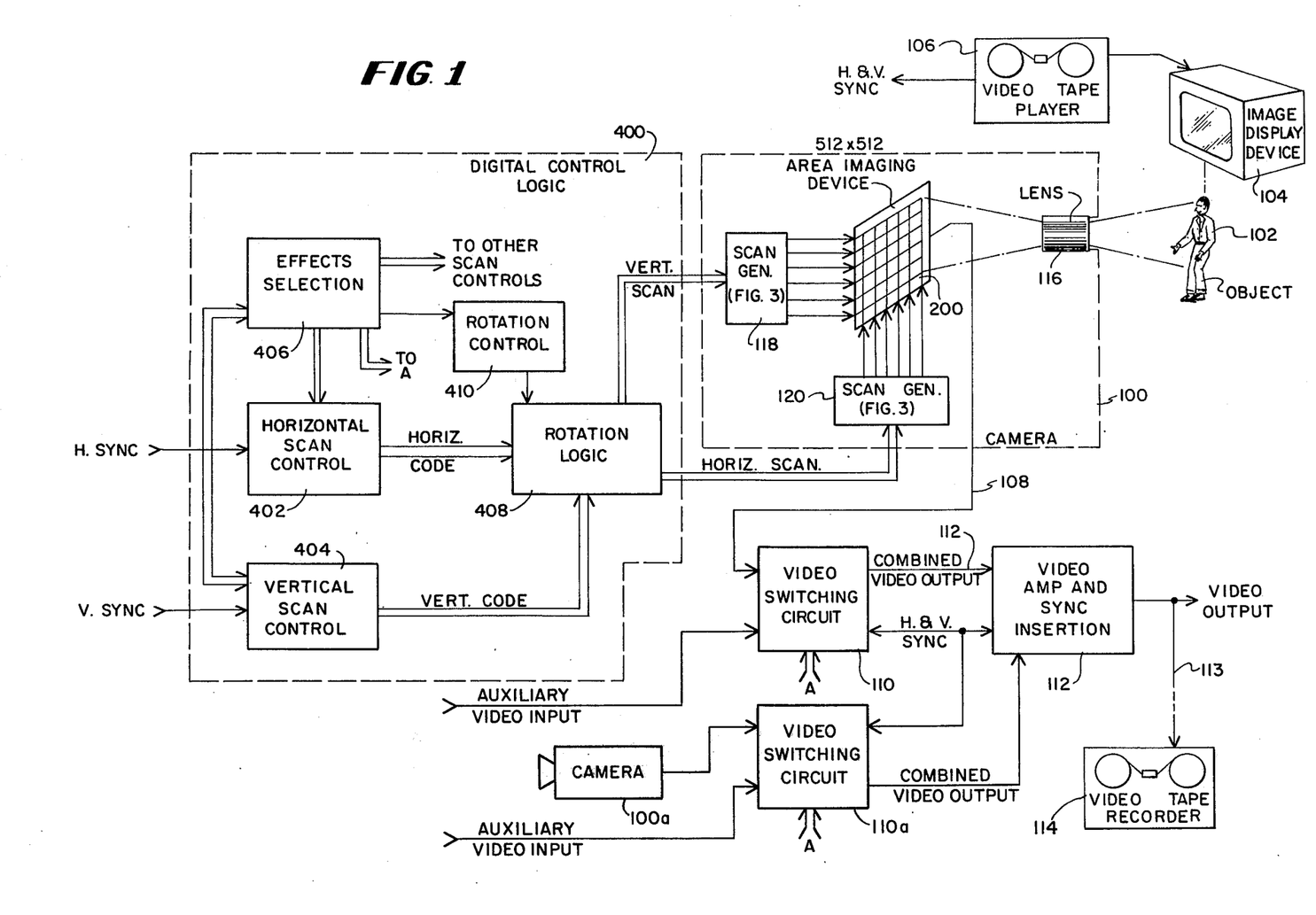
FIG. 1 is an overview block diagram of a special effects generator designed in accordance with the present invention.

FIG. 1 presents an overview block diagram of the present invention in its preferred form. A television camera 100 is used to capture an image of an object 102 under the control of a digital control logic 400. A video output signal is developed by the camera 100 and flows over a signal path 108 to an optional video switching circuit 110. The switching circuit 110 may combine the signal from the camera 100 with video signals originating from other sources, for example, other cameras like the camera 100. The output signal of the switching circuit 110 may be further amplified and combined with synchronizing signals by passage through a video amplifying the sync-insertion circuit 112. The resulting composite video signal which appears at 113 may be sent directly to a television transmitter (not shown), or to a suitable television display device (not shown), or it may be recorded using a video tape recorder 114.

In accordance with the present invention, the camera 100 contains an area imaging device 200 which may be scanned in any arbitrary manner under the control of the digital control logic 400. A lens 116 mounted upon the camera 100 focuses an image of the object 102 upon the area imaging device 200. The device 200 is an array of light-sensitive semiconductor devices each of which is individually addressable by a pair of scan generators 118 and 120. The digital control logic 400 determines the precise order in which the semiconductor devices are scanned by supplying a time sequence of numeric values to each of the two scan generators during the scanning of each video field or frame and by repeating the time sequence for each new video field or frame.

The area-imaging device 200 supports a first plurality of horizontal conductors which may be selectively energized by the scan generator 118 and a second plurality of vertical conductors which may be selectively energized by the scan generator 120. The semiconductor devices, in this case bipolar transistors, are connected between the conductors where they cross one another to form a switching matrix, in this embodiment a 512 × 512 array. The scan generators are each arranged to energize a unique one of the conductors for each possible binary signal pattern which it can receive. Although bipolar devices are shown, MOS charge coupled or charge injection devices may also be used.

At the time when any given semiconductor device is to be scanned, the digital control logic 400 supplies an appropriate pair of binary signals to the scan generators 118 and 120 to energize the horizontal and vertical conductors across which the device is connected and thereby causes a signal to flow from that particular device into the video output of the imaging device 200. The binary signal supplied to the scan generator 120 may be thought of as representing the $x$ (or horizontal) coordinate of the semiconductor device, and the signal supplied to the scan generator 118 may similarly be thought of as representing the $y$ (or vertical) coordinate of the semiconductor device. From this point of view, the digital control logic 400 may be thought of as generating pairs of $x$ and $y$ coordinate values for the points in the image which are to be scanned in sequence.

If no special effects are desired, the digital control logic is programmed to generate the $y$-coordinate values, in numeric order, e.g., 0–512, during each frame-scanning interval; and it is programmed to generate the $x$-coordinate values, e.g., 0–512, beginning with zero, during the generation of each $y$-coordinate value. In this manner, a series of horizontal scans are achieved which are shifted vertically from one another. To achieve interlace, the $y$-coordinate values may be all odd-numbered values during the first, third, (etc.) fields and all even-numbered values during the second, fourth, (etc.) fields so that any two successive fields can interlace with one another to form a complete frame.

Special effects are achieved in the first instance by simply altering the sequence of $x$- and $y$-coordinate values which are supplied during each field-scanning interval. The size of an image may be increased or decreased by decreasing or increasing the number of coordinate values generated during a normal horizontal or vertical scanning interval, or alternatively by changing the numeric spacing between successively-generated coordinate values. The position of an image may be shifted horizontally or vertically by starting the $x$- and $y$-coordinate scans at zero counts that do not correspond to the beginning of the normal horizontal and vertical scanning intervals. Image rotation may be achieved by cross-adding or subtracting the $x$- and $y$-coordinate values after multiplying them by appropriate factors before applying the values to the scan generators. Even pseudo-random fragmentation of an image may be achieved by generating $x$- and $y$-coordinate values which appear random but which actually do cause the entire image area to be scanned during each field or frame time interval. This type of scanning could be used to generate interesting patterns or even for cryptographic purposes.

The digital control logic 400 contains a horizontal scan control 402 and a vertical scan control 404. The horizontal scan control 402 is synchronized with horizontal synchronizing signals to generate sequences of binary numbers during each horizontal scanning interval. The vertical scan control 404 is similarly synchronized by vertical synchronizing signals to generate sequences of binary numbers during each vertical scanning interval. The number of sequences generated by the two scan controls 402 and 404 are normally passed directly to the two scan generators 118 and 120 within the camera 100.

The scan controls 402 and 404 preferably contain counters which normally count continuously and which thereby generate sequences of increasingly large or small numbers; for example 0–512 or 512–0. These counters are preferably reset to zero or to some other intitial value by the incoming horizontal or vertical sync pulses either directly or after a suitable time delay. The scan controls 402 and 404 may also contain function generators, such as read-only-memory devices, which may be driven by the counters to generate highly arbitrary numeric sequences in synchronism with the advancement of the counters. The scan controls may further interact with one another and may be reprogrammed at any time or even continuously by the effects selection logic 406. The scan controls may cause any arbitrary section of an image to be scanned in any arbitrary manner. They can rearrange the order in which image portions are scanned with respect to the normal television scanning pattern that always proceeds from left to right at a high rate of speed and from top to bottom at a slow rate of speed. Multiple image effects, images whose size have been increased or decreased, and displaced images can readily be achieved by properly programming the scan controls 402 and 404.

The scan controls 402 and 404 can also be used to achieve rotation of scanning patterns on the area imaging device 200 through the use of read-only memories and other such devices. In the preferred embodiment of the invention, a separate rotational logic 408 is provided and is controlled by a rotation control 410. The rotation control 410 may include a manual lever which permits an operator manually to rotate a special effect. Alternatively, the rotation control may contain an automatic counter or some other digital-number-generating device. The rotation control 410 simply generates a binary number that indicates the desired degree of rotation. That number is fed into the rotation logic 408 and controls the combining of the horizontal and vertical coordinate values that are generated by the scan controls to form the proper horizontal and vertical coordinate values such that a rotated scan is developed, with the degree of rotation controlled directly by the magnitude of the number supplied by the rotation control. By combining the functions of the rotation logic 408 with those of the scan controls 402 and 404, it is possible to shift any portion of the image which strikes the area-imaging device to any desired position with any desired degree of rotation and magnified or reduced by any desired amount.

Figure 5A:
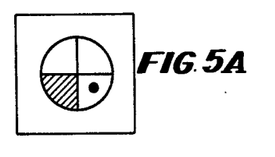
FIGS. 5A–5I illustrate a few of the many interesting special effects which may be achieved using the present invention.
Figure 5B:
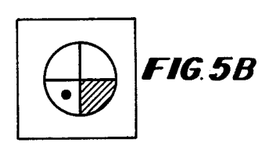
Figure 5C:
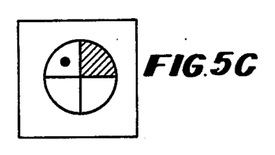

FIGS. 5A–5I illustrate a few of the many special effects which may be achieved using the present invention. In FIG. 5A, a pattern is shown. It may be presumed that this pattern is placed before the camera 100 at the location 102 in FIG. 1 and that an image of this pattern is projected by the camera 100 onto the imaging device 200.

The pattern shown in FIG. 5A may be captured by the camera 100 as it is. A counter within the horizontal scan control 402 may be arranged to continuously generate count values that vary from, say, 0 to 512 during each horizontal scanning interval, and a similar counter within the vertical scan control 404 may be arranged to generate, during each vertical scanning interval, count values that range from 0 to 512, counting by 2s, during even fields and from 1 to 511, counting by 2s, during odd fields. The rotational logic 408 may be programmed to pass these count values directly from the scan controls to the scan generators without alteration. The array of the area imaging device 200 is thus scanned from left to right and from top to bottom beginning with the sensor corresponding to the upper left corner of the image (designated as $A_{1,1}$) and ending with the sensor corresponding to the lower right corner of the image (designated as $A_{512,512}$). A normal interlaced television-type scan is thereby achieved which does not provide any special effects. In this case, the pattern illustrated in FIG. 5A is supplied to the system composite video output essentially without any alteration.

The image of the pattern may be reversed by simply having the special effects selection logic 406 reverse the direction of the counter within the horizontal scan control 412. This causes the array of the device 200 to be scanned from right to left and top to bottom beginning with the upper right corner ($A_{1,512}$) and ending with the lower left corner ($A_{512,1}$). As a result, the image presented by the signal at 113 is then reversed from left to right, as in FIG. 5B. If the vertical counter within the vertical scan control 404 is also reversed (so that the array is scanned from $A_{512,512}$ to $A_{1,1}$), the image is effectively rotated 180° from its original position, as in FIG. 5C.

Figure 5D:
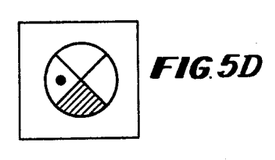
Figure 5E:
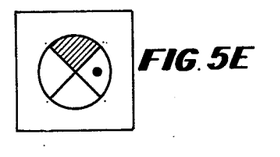
Figure 5F:
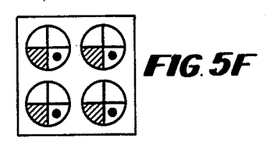
Figure 5G:
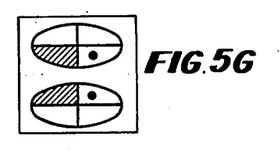
Figure 5H:
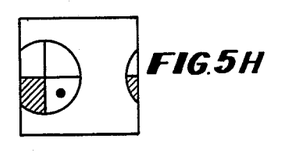

Actuation of the rotation control 410 causes the signals which are fed to the scan generators 118 and 120 to be arithmetic combinations of the horizontal and vertical count values supplied by the scan controls 402 and 404. If the horizontal and vertical count values supplied by the scan controls are effectively multiplied by one-half the square root of 2 and then added before being applied to the scan generator 118 and then subtracted before being applied to the scan generator 120, a 45° counterclockwise scan rotation is achieved. On the assumption that the direction of the horizontal count is also reversed, the resultant output image appears as shown in FIG. 5D — rotated counterclockwise by 45° and reversed from left to right. If the vertical scan were reversed, instead, the resultant image would appear as shown in FIG. 5E. It is contemplated that the rotation control 410 may be actuated to give any desired degree of rotation from 0° to 360°. For any desired degree of rotation, the outputs of the two scan controls are multiplied by the sine or cosine of the desired angle of rotation and are then added and subtracted before being applied to the scan generators.

Multiple images may be achieved by causing more than one horizontal or more than one vertical scan to be executed during a single horizontal or vertical scanning interval. For example, the sequence of x-coordinate digits may be selected to scan only every other semiconductor element in each horizontal row, but to scan each horizontal row twice instead of once. Similarly, the sequence of y-coordinate digits may be selected to scan only every other horizontal row, but to repeat the scanning of the horizontal rows twice during each vertical scanning interval. In this mannner, four reduced-sized images are caused to appear in the composite video output, as in FIG. 5F. This effect may be achieved quite simply by shifting each signal line entering the two scan generators to effectively multiply the horizontal and vertical scan values by 2. The signal lines representing the most significant scan-value binary digit may be connected to the least-significant scan value binary input of the scan generator to prevent any semiconductor device from being scanned more than once during the scanning of each frame. If the semiconductor devices are of the type which integrate incident light, as is normally the case, such a crossing over of the most-significant digit can double the light sensitivity of the array.

A multiple-image effect may also be achieved by doubling the speed of the counters within the scan controls. For example, the effect illustrated in FIG. 5G may be achieved by doubling the speed of the counter within the vertical scan control and by additionally arranging for that same counter to reverse its direction of count when it reaches the end of a full count. A double-vertical, stretched-horizontal image is thus achieved. By reversing the direction of count, the lower image is caused to be a mirror image of the upper image, as is apparent in FIG. 5G.

Image movement from left to right or from top to bottom may be achieved by starting the counters within the scan controls 402 and 404 at non-zero count values. The effect shown in FIG. 5H, for example, is achieved by starting the counter within the horizontal scan control at an initial count value that is neither zero nor the maximum-count value, thereby permitting the counter to reach a full count and to begin counting again at any given point on each horizontal scan, thereby shifting the image to the left. Similar modifications may be made to the counter in the vertical scan control 404, and hence a portion of an image may be shifted to any desired vertical location.

Figure 5I:
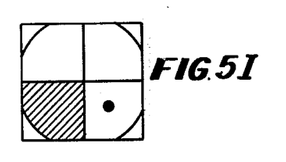

FIG. 5I illustrates how a reduction or increase in the size of an image may be achieved. An increase in the size of an image, as in FIG. 5I, is achieved by adjusting the counters within the scan controls 402 and 404 to produce a slower rate of horizontal and vertical scanning over a limited portion of the area imaging device 200, neglecting or not scanning portions of the device 200. Naturally, the amount by which the size of an image may be increased in size is limited by the spacing of the light-sensing semiconductors within the device 200, and a greatly increased image size can produce a reduction in the quality of the captured image.

The horizontal and vertical scan controls 402 and 404 preferably also contain function generators which may be read-only memory devices or other addressable memory devices. The function generators may be driven by the horizontal and vertical counters to generate highly arbitrary numeric functions which can give rise to an almost infinite variety of different special effects. For example, a totally scrambled picture may be achieved by storing a highly arbitrary sequence of numbers in memory and by then retrieving the numbers from sequential locations within the memory to control the scanning process. Through the combined actions of function-generating memories, reversible and variable-speed counters, and rotational logic mechanisms, any image may be dissected and reassembled in almost any conceivable manner.

It is contemplated that auxiliary cameras similar to the camera 100 may be used in conjunction with the camera 100. The output signals from such cameras may be fed into an auxiliary video input of a common video switching circuit 110, or preferably, a separate video switching circuit such as the video switching circuit 110a may be employed in conjunction with an auxiliary camera 100a. All of the cameras 100 may be similtaneously controlled by a single digital control logic 400, or a separate digital control logic 400 may be provided for each camera to produce unique scanning patterns at each different camera. A special-effects selection control 406 may be provided to control the operation of the overall system. The video output signals generated by each of the cameras may be fed into the video switching circuit 110 or 110a. The switching circuit 110 or 110a simply feeds varying time-segments from each of the incoming video signals into a combined video output under the control of signals generated by the effects-selection logic 406. In this manner, arbitrary special effects containing plural segments captured by the various cameras may be achieved. It is also permissible for the other video signals which are fed into the video switching circuits 110 and 110a to come from more conventional sources, such as conventional television cameras, video tape recoders, slide film cameras, or the like. If only two cameras are used, the switching circuitry 110 may be a conventional special effects generator of the type described in U.S. Pat. No. 3,758,712, for example.

The preferred embodiment of the invention is disclosed for use in a black-and-white television system. It is contemplated that the invention may also be constructed for use in processing color television signals. In color television applications, a plurality of image-sensing devices 200 would be required, one for processing each color of the image, and special color-separation mirrors or prisms would be required to break up the incoming image into separate images which could be detected individually by the plural image-sensing devices. A video output signal 108 may then be generated by each image-sensing device, and the resultant plural video output signals may then be combined in the same manner that they are combined by a conventional television camera to achieve a composite color signal, including the proper color-burst signal. Other techniques may be used to extract a color video signal from a single image-sensing device 200, such as the technique described in an article by Albert Macovski entitled "Spatial-Frequency Encoding Techniques Applied To A One-Tube Color Television Camera" which appeared in the December, 1970 issue of the IEEE TRANSACTIONS ON BROADCASTING, Volume BC-16, No. 4, pages 75–80.

The resolution of the disclosed system is limited by the number of individually-addressable light-sensing semiconductor devices which may be contained within the imaging device 200. The frequency-response or speed of the disclosed system is established by the rate at which individual light-sensing semiconductor elements may be individually scanned in a random manner by the scan generators 118 and 120. The speed at which the system may operate may also be limited by the speed at which the digital logic used in constructing the horizontal and vertical scan controls 402 and 404 and the rotational logic 408 is able to function.

Area-imaging devices containing a relatively limited number of semiconductor elements are currently available for use in constructing the camera 100. A suitable bipolar-transistor light-sensing array is described in an article entitled "Integrated Electronics For A Reading Aid For The Blind" by J. S. Brugler, et al., IEEE JOURNAL OF SOLID-STATE CIRCUITS, Vol. SC-4, No. 6, pages 304 to 312 (December 1969). A MOS-transistor light-sensing array is described in an article entitled "MOS Electronics For A Portable Reading Aid For The Blind" by James D. Plummer, et al., IEEE JOURNAL OF SOLID-STATE CIRCUITS, Vol. SC-7, No. 2, pages 111 to 119 (April 1972). A random access MOS-transistor light-sensing array is described in a publication entitled "CID (Charge Injection Device) — Theory of Operation and Random Access Description", published by the Tube Products Department of the General Electric Company of Syracuse, New York (June 1974). The small size of these conventional arrays limits the resolution or detail which they can achieve, but the same small size of these arrays also greatly reduces the speed at which the scan generators have to operate and thereby makes it possible for such low-resolution arrays to be used in real-time systems operating at conventional-television-system frequencies. The same technology which is used to fabricate the small arrays described in the above articles may be used to fabricate much larger arrays containing many additional light-sensing elements and capable of achieving a much higher degree of resolution. For example, a short article in *ELECTRONICS* Magazine for Aug. 30, 1973 (pages 36 and 37) describes a television camera which includes a 10,000-element semiconductor array. An article in *Electronics News*, Feb. 3, 1975, page 42, describes a charge coupled device (CCD) sensor camera with 512 vertical picture elements and 320 horizontal picture elements. As disclosed in the present application, the array is shown to be 512 elements by 512 elements, and the elements are assumed to be bipolar transistors of the type described in the Brugler, at al. article. With an array of this size, image quality comparable to standard television broadcasting may be achieved. The achievement of arrays of this size is simply a matter of scaling up the size of the smaller arrays which are currently available. When such a large array is used, one may exceed the ability of the digital logic to keep up with the speed of a conventional television scanning operation. Extremely high speed logic, such as emitter-coupled logic and Schottky-barrier-diode logic, will have to be used in constructing the counters within scan generators 118 and 120 and possibly also in constructing the elements 402, 404 and 408. Alternatively the scanning rate of the entire system may be scaled down to a level that is within the capabilities of the logic that is used. For example, by slowing the scanning rates to one-fourth or one-eighth the normal rate, it is possible that conventional TTL-logic elements could be used, or even MOS-FET logic. Naturally, such a slowing of the rate of scan could produce an objectionable flicker and would render the system incompatible with a standard television system. However, the video tape recorders 106 and 114 can be slowed down so that the special effects are carried out at a slow rate of speed. The video signal recorded by the recorder 114 can later be played back at a high rate of speed for reproduction on standard television receivers. In this way, special effects can be achieved at standard television scanning speeds even though the special effects generator is incapable of maintaining such speeds.

Figure 2:
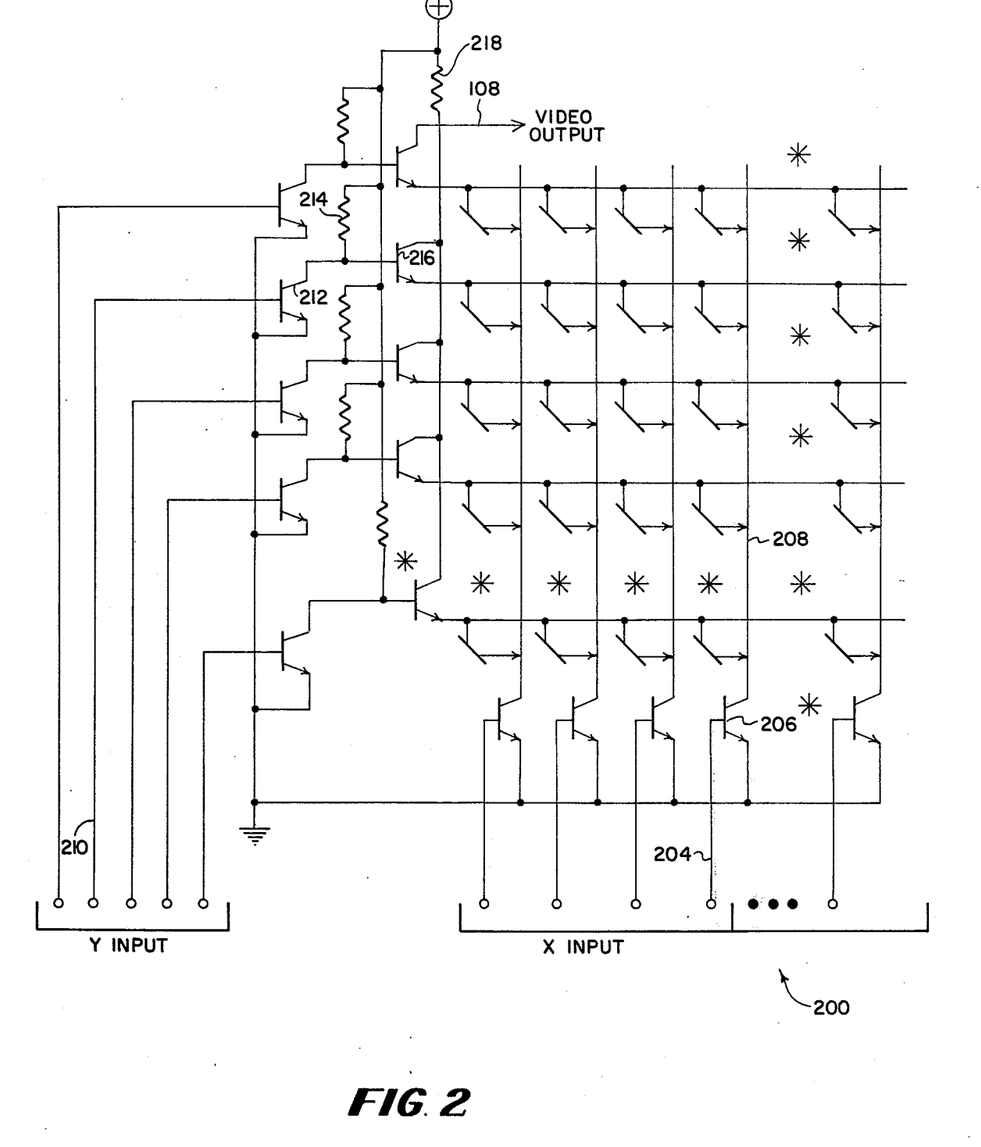
FIG. 2 is a circuit diagram of a suitable area imaging device or two-dimensional light sensor which comprises a two-dimensional array of light-sensitive transistors having their base regions arranged to capture incoming light and having their emitter and collector regions respectively connected to horizontal and vertical conductors which may be scanned in an arbitrary manner.

It is contemplated that each transistor in the array is to be individually scanned. Scanning is carried out by connecting the collector of one of the transistors in the array to a resistor that is connected to a source of positive potential while simultaneously grounding the emitter of that transistor. With reference to FIG. 2, the emitters of the transistors in any column of the array may be simultaneously grounded by actuating an $x$ input, thereby causing a bipolar transistor to ground the emitters in that particular column. The collectors of all the transistors in a given row may be connected to the positive potential connected resistor by means of a pair of transistor switches which respond to a $Y$ input signal by connecting all of the collectors in a given row of the array to the resistor. The video output signal from the array is then taken across the resistor connected to the transistor corresponding to the activated $X$ and $Y$ inputs and filtered, if necessary, to remove switching transients from the output.

Assume that it is desired to sample the output from the light detecting transistor 202 in the area imaging device 200, a positive level signal is applied to the $X$ input lead 204 to render the transistor 206 conductive and to ground the vertical lead 208 which is connected to the emitters of all of the transistors in the same column as the transistor 202. A ground level potential is simultaneously provided to a lead 210 at the $Y$ input of the area imaging device to render a transistor 212 nonconductive. A resistor 214, one end of which was previously grounded by the transistor 212, supplies a forward biasing potential to the base of a transistor 216, thereby rendering the transistor 216 conductive when the transistor 212 is rendered nonconductive. The transistor 216 connects one end of a resistor 218 to the collectors of all of the transistors in the same row as the transistor 202. The other end of the resistor 218 connects to B+, and the video output from the array is taken from the junction of the resistor 218 and the collectors of the transistors connected thereto.

During the time interval after the transistor 202 was last scanned, any photons which have struck the base region of the transistor 202 have caused the generation of a charge in that base region which is equivalent to the charge injected into the transistor in response to a base current input. Accordingly, when the leads 204 and 210 are actuated as just described, a collector-to-base current flows through the transistor 202 that is proportional in magnitude to the charge developed within the base region of the transistor 202. Accordingly, an output signal is developed across the resistor 218 which is proportional to the amount of light striking the transistor 202 amplified by the transistor 202. In the manner just described, every element of the array 200 is individually scanned, and the combined outputs of all the array elements appear as a video signal developed across the resistor 218. An MOS array such as the CCD and CID devices previously described would be scanned in a similar manner.

By way of example, but not by way of limitation, the array 200 may be constructed as an integrated circuit upon a lightly doped P-substrate having an N-type epitaxial layer grown thereon and having buried N+ regions below each transistor on the substrate. It is contemplated that the buried N+ regions will serve as the collectors of the transistors, and that these buried regions will run horizontally across the integrated circuit so that the collectors of the transistors in each row are inherently connected together electrically. The collectors may also be connected by means of a diffused N+ region which may also run horizontally across the epitaxial layer and interconnect the collectors of the individual transistors. P-type regions may be diffused into the epitaxial layer to serve as base regions. These P regions will be made as large as is practical to maximize the capture of light by the integrated circuit device. N-type emitter regions are diffused into these base regions. The entire integrated circuit is coated with a thin oxide overlay and the oxide overlay is stripped away in the areas over the emitter regions to permit the emitters of the transistors in each column to be interconnected by vertical stripes of aluminum metalization or its equivalent. The transistors 212, 216 and 206 are constructed in a conventional manner in an area along the edges of the substrate, as are the resistor 214 and the resistor 218. The X and Y input leads are brought to the edge of the chip for interconnection with a suitable set of leads. Alternatively, the scan generators 118 and 120 may be fabricated on the same substrate, thereby greatly reducing the number of leads required to connect the substrate to external logic. Once again, the size of the array is determined solely by the amount of resolution that is desired, and may be large or small depending on the particular application. The particular types of transistors used in constructing the array again may be of either NPN of PNP types of a high or low speed variety in accordance with the application and the desired scanning speed. Thus, a workable embodiment of the invention could be constructed using a small array having only about 100 light sensing elements (10 × 10) using low speed logic to construct the scan generator and other logical portions. Such an array and scan generator configuration is suitable for certain uncritical applications where high speed and sharp detail provided by the 512 × 512 array previously described are not essential.

Figure 4:
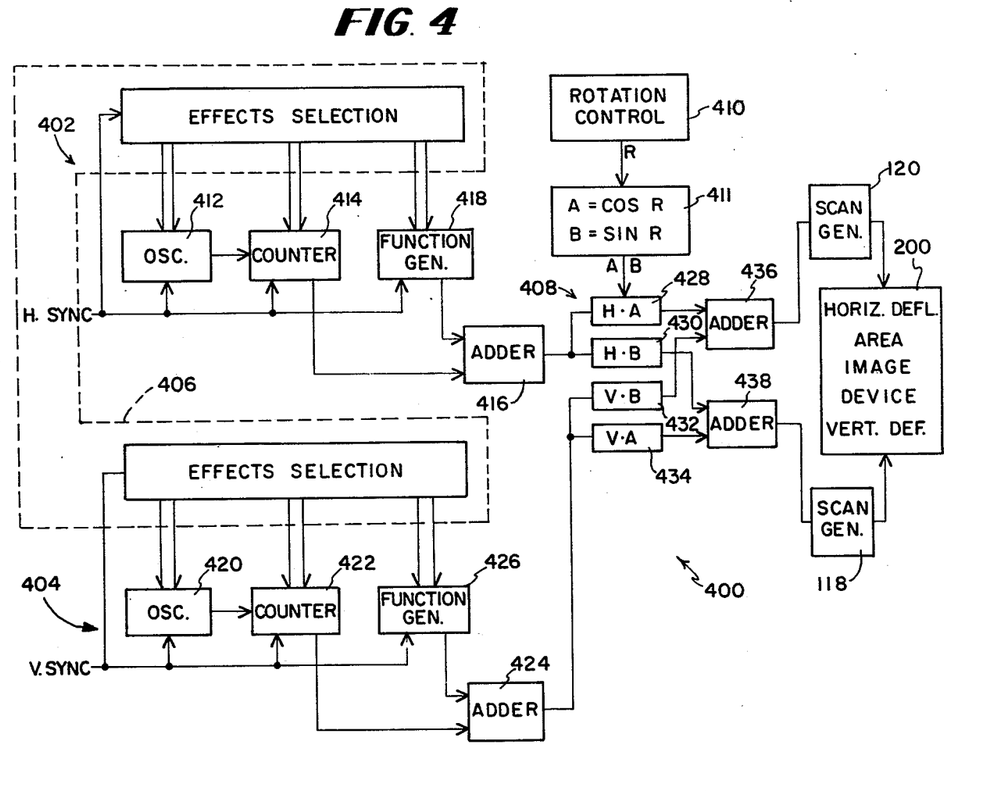
FIG. 4 is a block diagram of a suitable digital logic system which may be used to generate sequences of horizontal and vertical binary values that may be used to control the scanning of an area imaging device.

FIG. 4 is a detailed block diagram of the digital control logic 400. A horizontal scan control 402 comprises a high frequency oscillator 412 which drives a counter 414. The speed of the oscillator 412 and the direction and range of the counter 414 are both controlled by the effects of selection logic 406. A horizontal sync pulse resets the oscillator 412 and counter 414 at the end of each horizontal scanning interval and also resets the effect selection logic 406, if necessary. The output of the counter 414 passes through a binary adder circuit 416 and becomes a horizontal code signal which is set into the rotational logic 408.

The output of a function generator 418 is fed into another input of the adder circuit 416. The function generator 418 could be an arbitrary arrangement of digital logic designed to generate any particular pattern of output signals, but preferably it is a read-only memory device which, in response to a given input address signal, presents the contents of an address location at its output. Since any arbitrary number may be placed into any addressable location within the memory, the read-only memory is able to function as a function generator which generates an arbitrary output function in response to any given address code input. The read-only memory 418 may be controlled directly by the effect selection logic 406 which thereby selects any arbitrary constants to add to the counter 414 output. If different constant values are required at different points during the scan, the effect selection logic 406 may be set up to respond to different values of the counter 414 output to change the address code which was presented to the function generator 418. A simple way to do this, as shown in FIG. 4, is to feed the counter 414 output directly into the address input of the function generator 418 so that different output values are produced from the function generator 418 in response to different count values being achieved.

The elements which comprise the horizontal scan control 402 are generally conventional in nature, since they are similar to the corresponding elements of conventional digital special effects generators. For example, a suitable oscillator is disclosed in FIG. 2 of U.S. Pat. No. 3,758,712 which issued to John P. Hudson on Sept. 11, 1973. A suitable counter for use as a counter 414 is disclosed in FIG. 6A of that same patent. The effect selection logic 406 may be similar to the control generation circuitry shown in FIG. 9 of the Hudson patent. The vertical scan control 404 is essentially similar to the horizontal scan control 402 both in its structure and in its function. The oscillator 420 may be similar to that shown in the top of FIG. 2 in the above-mentioned Hudson patent adjusted appropriately to run at a lower speed, or may be dispensed with and the counter may be arranged to count horizontal sync pulses. The counter 422 may be similar in structure to the vertical counter shown in FIG. 5A of the above-mentioned Hudson patent. The effect selection logic 406 again may be analogous to the circuitry shown in FIG. 9 of the Hudson patent, and the function generator 426 may again be a read-only memory of conventional design. The two adders 426 and 424 are both of conventional design and may be similar to the adder 680 which appears in FIG. 6B of the Hudson patent.

The rotation control 410 may be a simple mechanism which converts the position of a lever or shaft into a digital number between 0 and 1. A suitable mechanism is disclosed in FIGS. 1, 3 and 4A of the Hudson U.S. Pat. No. 3,758,712, that patent discloses how the position of a lever driven potentiometer may be converted into a binary number R representation of the degree of rotation desired. The binary number R developed by the rotation control 410 is converted into its x and y coordinates A and B, where A equals the cosine of R and B equals the sine of R, by a sine and cosine function generator 411. The signals A and B are fed into four hardware multiplier circuits 428, 430, 432 and 434. The hardware multiplier circuit 428 multiplies the horizontal code signal from the adder 416 by the binary number A to generate the contribution of the horizontal code signal to the horizontal component of the rotated image. The multiplier circuit 430 multiplies the same horizontal code signal by the binary number B to generate the contribution of the horizontal code signal to the vertical component of the rotated image. The vertical code signal is similarly multiplied by the numbers B and A by the multiplier circuits 432 and 434 to generate the contributions of the vertical code signal to the vertical component of the rotated image. The resulting products of the multiplier circuits 428 and 432 are summed by an adder 436 to generate a horizontal scan control signal, and the products generated by the multipliers 430 and 434 are summed by an adder 438 to generate a vertical scan control signal. The vertical and horizontal scan control signals control the vertical and horizontal scan generators 118 and 120 which scan the area image device 200.

Read-only memories may be used in implementing the sine and cosine function generator 411. Arrays of memory elements would be addressed in pairs by the rotational code number R, and the sine and cosine representative numbers A and B would be retrieved from the addressed memory locations. The multipliers 428, 430, 432 and 434 could be implemented using integrated circuits in which each bit signal line from the A or B signal would control a latch that would pass anywhere from one to all of the horizontal code or vertical code signals onto a series of binary adders which would add the latch outputs in accordance with the weight of their controlling binary signal lines. In this manner, for example, the multiplier 428 can be realized using eight latches and seven binary full adders. In embodiments of the invention, where the horizontal and vertical code values always ramp upwards and downwards in single count increments and never take jumps in values in the middle of a scanning interval, simple multiplication circuits may be realized which are similar to the square shown in FIGS. 7B and 7C of the above-mentioned Hudson U.S. Pat. No. 3,758,712. Here the initial product value is stored in a latch, and then the value A (or B) is added to or substracted from that original value each time the horizontal code value is increased or decreased in value. It is conceivable that such an embodiment of the invention could even dispense with the counter 414 and simply allow the pulses generated by the clock 412 to drive the two multipliers 428 and 430 directly, since only an initial product value and incremental pulses would be required by such a multiplier. Other multiplier circuits exist which could be used in this application, so it is not intended to limit the present invention to any of the arrangements just described.

Figure 3:
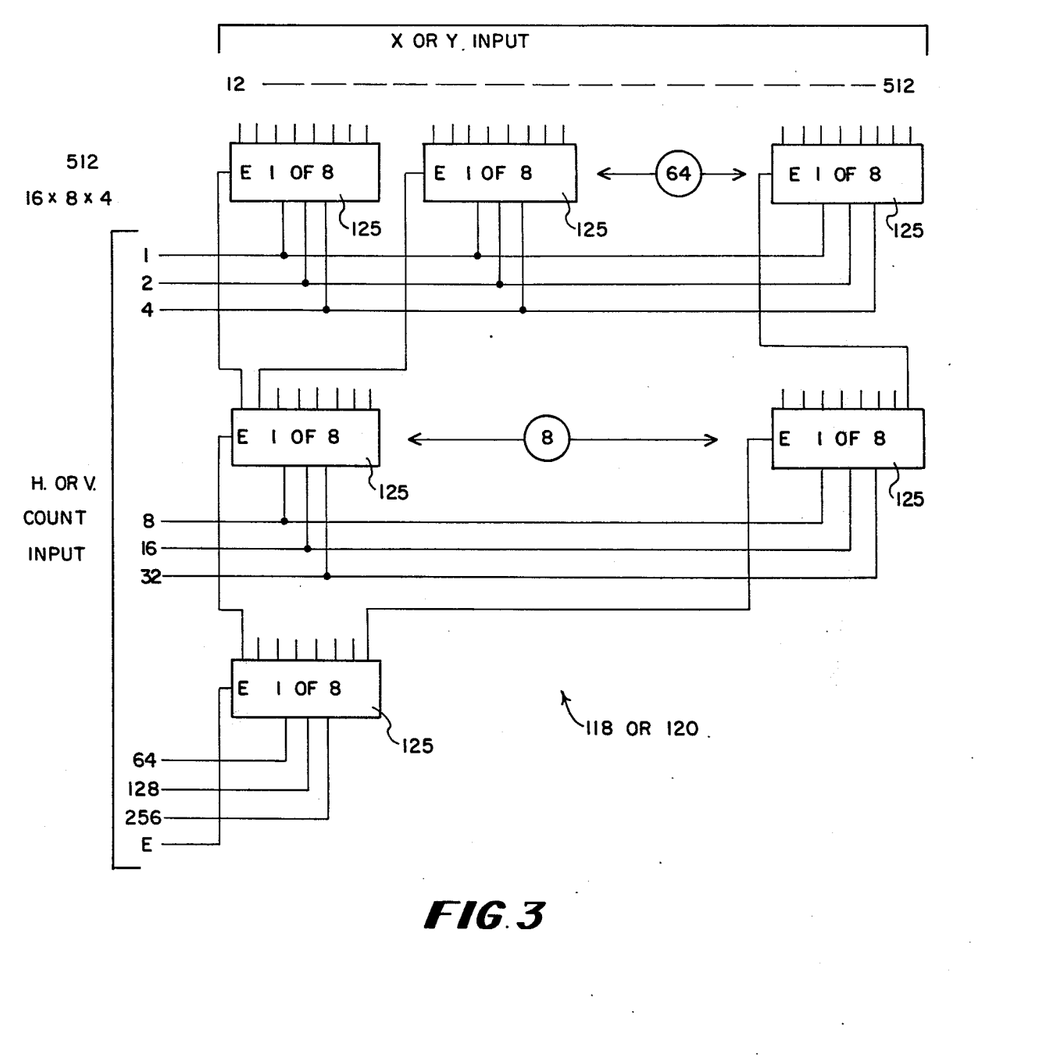
FIG. 3 is a logic diagram of a scan generator which may be used to convert a binary number into a one-out-of-512 scanning signal suitable for application to the horizontal or vertical conductors of the area imaging device shown in FIG. 2.

FIG. 3 is a logic diagram of a suitable scan generator for use as element 118 or element 120. In FIG. 3, it is assumed that the area imaging device includes an array of image detecting elements with 512 rows and 512 columns. The scan generators 118 and 120 comprise simply a series of "one of eight" binary decoders 125, each having an enable input E and each of which is able to decode a 3-bit input signal into one out of eight output signals. When arranged as shown in FIG. 4, the decoders 125 respond to any 9-bit number being presented to the signal lines 1, 2, 4, . . . 256 by generating a high level output signal on only one of the signal lines 1, 2, 4, . . . 512. Seventy-three one-of-eight decoders are required by the circuits, and preferably they are formed as integrated structures on the same substrate as the area imaging device. However, if that is not practicable, these structures may be placed upon a separate integrated circuit chip or they may be constructed from discrete logic elements utilizing one discrete logic element for each one-of-eight decoder. Naturally, if the size of the area imaging device is reduced, the complexity of the scan generators is also reduced proportionally. It is to be understood that many other suitable scan generating circuit configurations may be used as well. Particularly in an integrated circuit device, alternative logic configurations might result in a saving of space or in an increase of speed over that shown.

While only the preferred embodiment of the present invention has been disclosed, it is to be understood that numerous alternative arrangements will readily occur to those who are skilled in the art. It is, therefore, intended by the appended claims to encompass all such modifications and alternative embodiments as come within the true spirit and scope of the invention.

What is claimed as new and desired to be protected by Letters Patent of the United States is:

1. A video special effects generator comprising:
a plurality of light sensitive elements arranged in an array for receiving light illumination, each of said elements being responsive to light illumination for providing an electrical signal representative of the quantity of light illumination received thereby;
means for individually addressing each one of said elements;
sequencing means coupled to said addressing means for rendering said addressing means operative to address said elements in a predetermined sequence; and
means operatively coupled to said sequencing means for altering said predetermined sequence.

2. A video special effects generator as recited in claim 1 wherein said elements are arranged in rows and columns in a two dimensional array.

3. A video special effects generator as recited in claim 2 wherein said addressing means includes column addressing means for selectively addressing all of the elements in one column and row addressing means for selectively addressing all of the elements in one row, said addressing means thereby being operative to address the element common to the addressed column and row.

4. A video special effects generator as recited in claim 3 wherein said sequencing means includes means for rendering said row addressing means and said column addressing means operative to address said rows and columns in a predetermined sequence.

5. A video special effects generator as recited in claim 4 further including utilization means coupled to said addressing means, said addressing means being operative electrically to couple the addressed element to said utilization means, said utilization means being responsive to said elements to generate a video signal representative of the light illumination received by the addressed elements.

6. A video special effects generator as recited in claim 5 wherein said sequencing means includes a counter and means responsive to the number in said counter for generating the address of one of said elements in response to each number in said counter.

7. A video special effects generator as recited in claim 6 further including a clock connected to said counter, said counter being responsive to said clock for changing the number therein.

8. A video special effects generator as recited in claim 7 wherein said counter includes means for rendering said counter responsive to said clock for counting in a forward and reverse direction.

9. A video special effects generator as recited in claim 7 wherein said sequence altering means includes means for changing the speed of said clock.

10. A video special effects generator as recited in claim 6 wherein said sequence altering means includes means for changing the address generated by the address generating means in response to predetermined numbers in said counter.

11. A video special effects generator as recited in claim 6 wherein said sequence altering means includes means for altering the number in said counter in a predetermined manner.

12. A video special effects generator as recited in claim 11 wherein said number altering means includes means for offsetting the number in said counter by a predetermined variable number.

13. A video special effects generator as recited in claim 6 wherein said sequence altering means includes a digital function generator.

14. A video special effects generator as recited in claim 13 wherein said function generator includes a memory.

15. A video special effects generator as recited in claim 13 wherein said function generator includes apparatus for generating the sine and cosine functions.

16. A video special effects generator as recited in claim 1 wherein each of said light sensitive elements is a phototransistor.

17. The method for generating special video effects comprising the steps of:
projecting an image onto an array of photosensitive elements;
sequentially addressing each of said photosensitive elements to provide a video signal representative of said image; and
altering the addressing sequence of said photosensitive elements to alter the video signal thereby to change the image represented by the video signal.

* * * * *